A. RICHARDS.
Improvement in Stalk-Chopper.
No. 126,986.  Fig. 1.  Patented May 21, 1872.
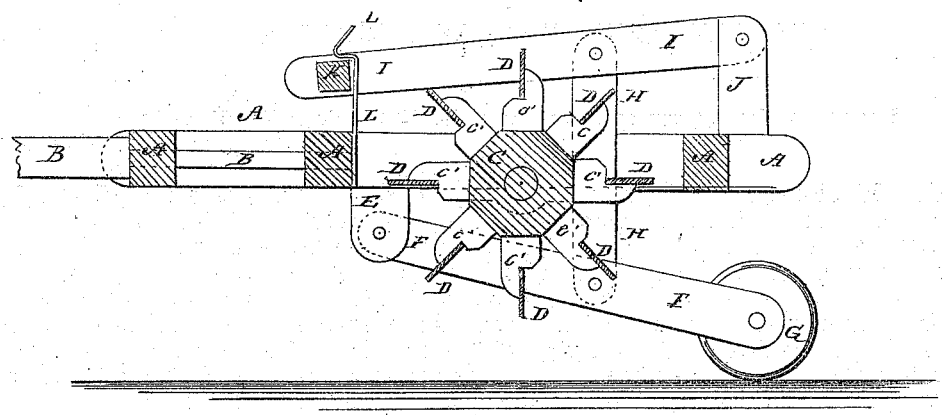
Fig. 2.
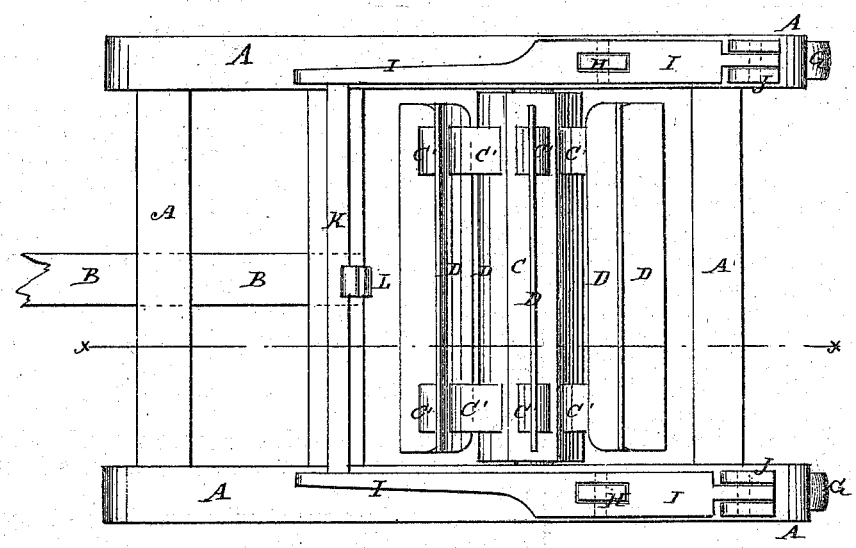
Witnesses:  Inventor:

No. 126,986

UNITED STATES PATENT OFFICE.

AUGUSTUS RICHARDS, OF ANDERSON, TEXAS.

IMPROVEMENT IN STALK-CHOPPERS.

Specification forming part of Letters Patent No. 126,986, dated May 21, 1872.

Specification describing a certain Improvement in Corn and Cotton Stalk-Chopper, invented by AUGUSTUS RICHARDS, of Anderson, in the county of Grimes and State of Texas.

Figure 1 is a detail vertical section of my improved machine, taken through the line $x\,x$, Fig. 2. Fig. 2 is a top view of the same.

My invention has for its object to furnish a simple, convenient, and effective machine for cutting or breaking up corn-stalks and cotton-stalks, to enable them to be conveniently turned under by the plow, and prevent them from interfering with the plowing.

The invention will first be fully described and then clearly pointed out in the claim.

A is the frame of the machine, to the forward cross-bars of which is rigidly attached the tongue B. C is a roller, which may be made of any suitable material possessing the requisite weight. E are the cutting plates or knives, which are securely connected with the roller C. In the case of small machines for operating upon the stalks of a single row, the knives D may be set in grooves in the roller C, and secured by staples or other convenient means. In the case of larger machines I prefer to attach the knives D to the outer ends of radial arms $c'$ attached to said roller C. The journals of the roller C revolve in bearings attached to the lower side of the middle part of the side bars of the frame A. By this construction, as the machine is drawn forward the roller C will break down the dry stalks, and the knives D will cut or break them into pieces, longer or shorter, according to the distance apart of the knives D, so that the said stalks will not interfere with the plowing, and will be "turned under" or covered with earth, thus enriching the soil and making it more light and porous. To brackets or studs E, attached to the lower side of the forward part of the side bars of the frame A, are pivoted the forward ends of the bars or levers F, to the rear ends of which are pivoted small rollers G. To the bars or levers F are pivoted the lower ends of the bars H, which pass up through slots formed in or keepers attached to the side bars of the frame A. The upper ends of the bars H are pivoted to the levers I, the rear ends of which are pivoted to short studs or standards J, attached to the rear parts of the side bars of the frame A. The forward ends of the levers I are connected by a cross-bar, K, which serves as a handle for operating said levers, and at the same time causes them to move together. By this construction, by forcing the forward ends of the levers I downward the rollers G are pressed against the ground, which raises the frame A and knife-roller C D away from the ground for convenience in turning and passing from place to place. L is a spring-catch attached to the forward part of the frame A, which, when the forward ends of the levers I are forced down, catches upon the cross-bar K, and holds the frame A and knife-roller C D away from the ground as long as may be desired.

Having thus described my invention, I claim as new and desire to secure by Letters Patent—

The combination of vibrating body-frame A E J, lever-frame I H, and wheel-frame F G with a chopper journaled in said body-frame, as and for the purpose described.

AUGUSTUS RICHARDS.

Witnesses:
ROBT. WHITLEY,
G. W. REDING.